United States Patent
Singh et al.

(10) Patent No.: US 12,231,400 B2
(45) Date of Patent: Feb. 18, 2025

(54) FIREWALL SWITCHOVER WITH MINIMIZED SESSION DISCONNECTION

(71) Applicant: Palo Alto Networks, Inc., Santa Clara, CA (US)

(72) Inventors: Tapraj Singh, Danville, CA (US); Harshavardhan Parandekar, San Jose, CA (US); Nazanin Magharei, San Jose, CA (US); Rimu Bhardwaj, Sunnyvale, CA (US); Vikram Guleria, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 227 days.

(21) Appl. No.: 17/663,257

(22) Filed: May 13, 2022

(65) Prior Publication Data

US 2023/0370422 A1  Nov. 16, 2023

(51) Int. Cl.
*H04L 9/40* (2022.01)
*H04L 61/2514* (2022.01)
*H04L 61/256* (2022.01)

(52) U.S. Cl.
CPC ...... *H04L 63/0236* (2013.01); *H04L 61/2514* (2013.01); *H04L 61/256* (2013.01); *H04L 63/0263* (2013.01)

(58) Field of Classification Search
CPC ............. H04L 63/0236; H04L 63/0263; H04L 61/2514; H04L 61/256; H04L 61/255
See application file for complete search history.

(56) References Cited

U.S. PATENT DOCUMENTS

| | | | |
|---|---|---|---|
| 7,941,837 B1* | 5/2011 | Jiang ................... | H04L 63/0209 713/153 |
| 8,363,549 B1* | 1/2013 | Zhu ...................... | H04L 63/0218 709/227 |
| 2004/0133690 A1* | 7/2004 | Chauffour ........... | H04L 67/1031 709/225 |
| 2018/0054418 A1* | 2/2018 | El Defrawy ............ | H04L 63/10 |
| 2019/0297057 A1* | 9/2019 | Raney ................. | H04L 41/0894 |

* cited by examiner

*Primary Examiner* — Sangseok Park
(74) *Attorney, Agent, or Firm* — Gilliam IP PLLC (57) ABSTRACT

A pseudo-active/active firewall configuration handles firewall switchover events with minimized session disconnection. A passive firewall is set to an active state, and an active firewall is switched to a pseudo-active state wherein it continues to process ingress and egress traffic according to traffic handling protocols for its active state. During updating of a corresponding Network Address Translation (NAT) table to route traffic to the now-active firewall, the pseudo-active firewall enters a forwarding state wherein it forwards ingress network sessions to the now-active firewall and processes the ingress network sessions according to its active state. The now-active firewall receives the ingress network sessions and records session states prior to discarding them. After updating the NAT table, when traffic is routed to the now-active firewall, the recorded session states are used to maintain active sessions.

20 Claims, 6 Drawing Sheets

FIREWALL SWITCHOVER WITH MINIMIZED SESSION DISCONNECTION

BACKGROUND

The disclosure generally relates to transmission of digital information (e.g., CPC section H04L) and to arrangements for maintenance or administration or management of packet switching networks (e.g., CPC section H04L 41/00).

High availability is a system configuration that enables maximal uptime during switchover and failover events in which one or more components of the system enter a passive state. High availability systems typically implement redundancy across components so that reserved or instantiated components enter an active state to compensate for a passive state for a different component. In the context of networking in a cloud, these components are cloud instances. The high availability configuration is maintained by an orchestrator that tracks load and fidelity (e.g., packet loss) at each cloud instance and manages scheduled and unscheduled active/passive states across cloud instances to avoid network downtime. Switchover events occur when components of the system enter planned passive states for a specified amount of time. Failover events occur due to unexpected component failure.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to performing firewall switchover events by entering a pseudo-active/active firewall configuration for firewalls in a cloud in illustrative examples. Aspects of this disclosure can be instead applied to various passive, active, and pseudo-active state configurations for firewalls or other computing components in operational contexts such as on-premises, across a wide area network, in an Internet of things, etc. In other instances, well-known instruction instances, protocols, structures and techniques have not been shown in detail in order not to obfuscate the description.

Overview

During switchover events in cloud firewall systems, stateful network sessions can experience disconnection due to previously-passive, now-active firewalls having no knowledge of current session states for network sessions that are redirected during the switchover event. Session state syncing requires control plane (CP) data (i.e., the session states) to be synced between pairs of firewalls in a high availability configuration. For transport layer protocols, the latency in communications along CP links would result in slowing down network throughput for these transport layer protocol sessions. The present disclosure proposes a "pseudo-active" state for a currently active firewall (firewall A) during a switchover event that allows firewall A to pair with a passive firewall (firewall B) in the high availability configuration. Using high availability data plane (DP) links, firewalls A and B sync session states to minimize session disconnection and dropped traffic during the switchover event. Once the IP address binding update begins, the CP of firewall A instructs the DP of firewall A to enter a forwarding state wherein it forwards ingress network sessions to the DP of firewall B. The DP of firewall A modifies packet headers in the ingress network sessions to include session state information so that firewall B can track session states. The CP of firewall B instructs the DP of firewall B to record session state information for packets received from firewall A along with other capture logs and discards packet contents. Prior to the IP address binding update, ingress and egress traffic is processed normally at firewall A with the addition of the forwarded ingress traffic to firewall B. Subsequent to initiating the IP address binding update and prior to expiration of the pseudo-active timer, a forwarding rule for firewalls in the cloud is updated according to a configuration for forwarding across a network of firewalls in the cloud to include firewall B and remove firewall A. Once the IP address binding update occurs and firewall B receives ingress and egress network sessions normally, firewall B is configured to track session states according to state information previously communicated via forwarded packets from firewall A. Firewall A is then deactivated when the pseudo-active timer expires and Firewall B handles stateful sessions that were previously established with firewall A without dropping traffic or disconnecting sessions.

Terminology

An "active" state for a firewall refers to a configuration for the firewall that allows handling of ingress and egress network traffic. While in its active state, a firewall is capable of handling traffic according to internal protocols for the firewall and/or a corresponding network including packet analysis, route advertisement, etc.

A "passive" state for a firewall refers to a configuration for the firewall wherein the firewall cannot handle ingress and egress network traffic. Firewalls in passive states can be completely deactivated preventing future deployment or can be in a suspended state awaiting reactivation. For instance, a firewall running on a computing device can be set to passive by powering down the computing device or setting the device to a sleep mode. Alternatively, a firewall can be set to a passive state by querying a CSP to remove the firewall from deployment.

A "pseudo-active" state for a firewall refers to a configuration prior to entering a passive state wherein the firewall is still able to handle ingress and egress traffic according to its active state and is on a pseudo-active timer that designates when the firewall will be deactivated. Firewalls in the pseudo-active state can be configured to perform operations in addition to normal operations performed in the active state such as data plane forwarding of network traffic.

Example Illustrations

Figure 1:
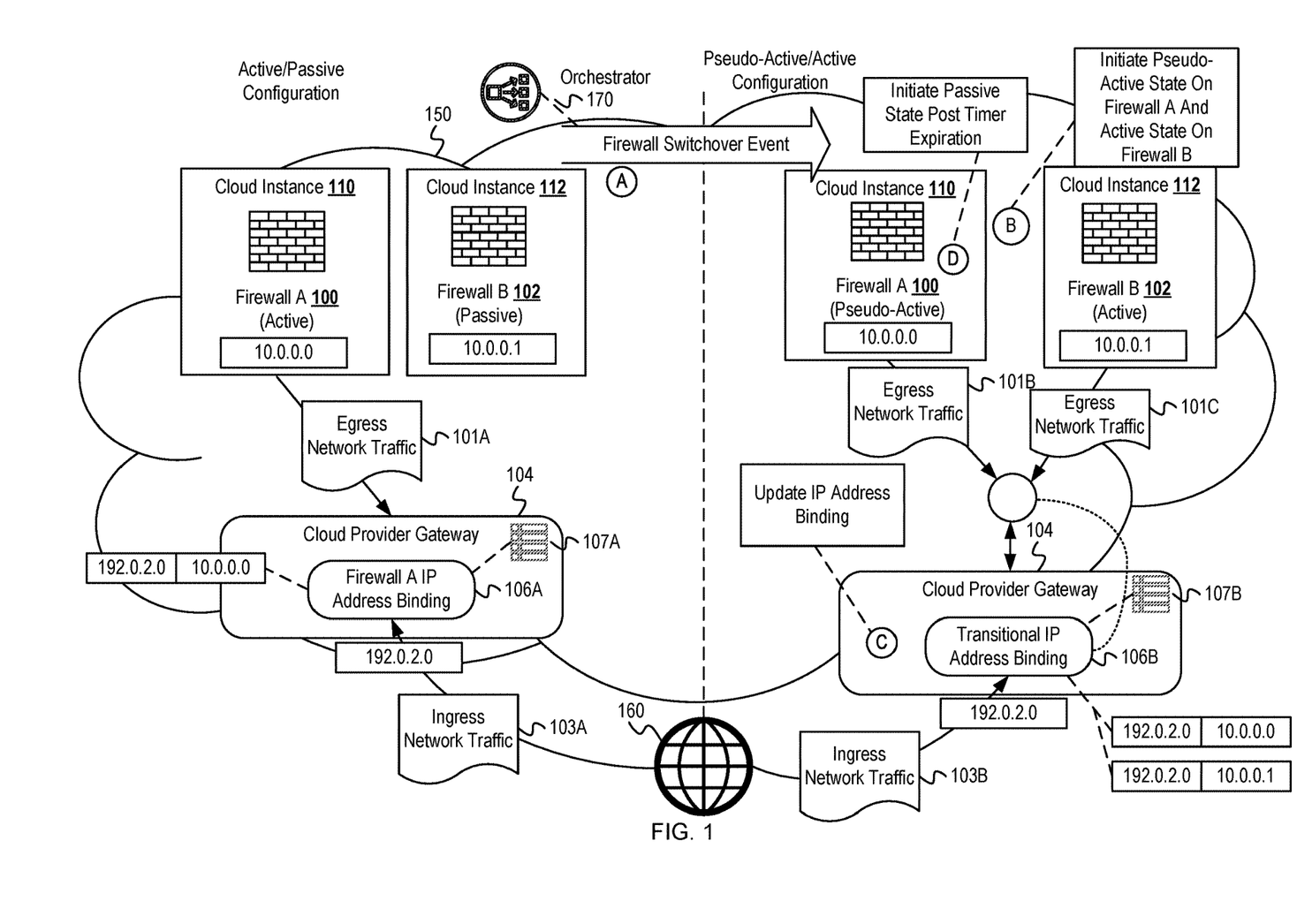
FIG. 1 is a schematic diagram of an example system performing a firewall switchover event using a pseudo-active/active firewall configuration.
Figure 2:
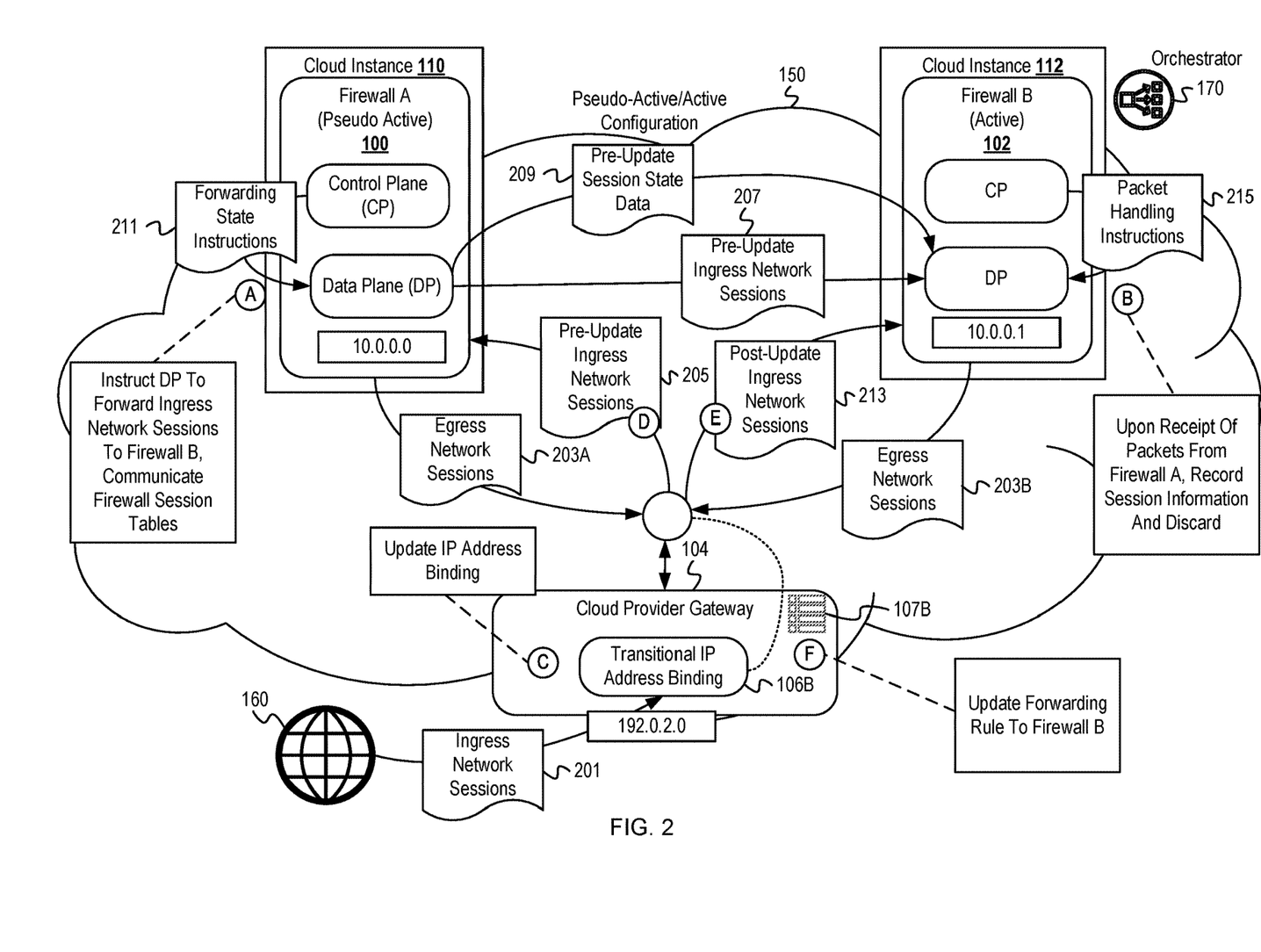
FIG. 2 is a schematic diagram of an example system for directing flow of network sessions for a pseudo-active/active configuration of firewalls.

FIGS. 1 and 2 are schematic diagrams illustrating pseudo-active/active configurations for cloud-based firewalls in a high availability (HA) deployment. High availability deployments of firewall disclosed herein have DP and CP links that sync sessions, security configurations, forwarding tables, Address Resolution Protocol (ARP) tables, etc. A load-balancer or other orchestration component detects switchover and failover events and instructs firewalls to enter active, passive, and pseudo-active states according to switchover and failover events to preserve network traffic flow at high availability. Firewalls can have internal timers that automatically detect switchover and/or failover events such as monitor fail timers, preemption hold timers, heartbeat timers, promotion timers, hello timers, etc. To exemplify, firewalls can be paired in a high availability configuration, and two paired firewalls can send heartbeat messages to each other that verify functionality in the form of Internet Control Message Protocol (ICMP) pings and if the time since the last ping exceeds the heartbeat timer, then a failover event is detected. While described in reference to a firewall switchover event, any of the embodiments disclosed herein can alternatively be applied to failover events detected at a firewall or by a firewall orchestrator.

FIGS. 1 and 2 are annotated with a series of letters A-F. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

FIG. 1 is a schematic diagram of an example system performing a firewall switchover event using a pseudo-active/active firewall configuration. Pseudo-active/active firewall configuration refers to a configuration of firewall A 100 and firewall B 102 with firewall A 100 in a pseudo-active state and firewall B 102 in an active state. The firewall switchover event is an event triggered by a request to initiate a passive state for firewall A 100 wherein it does not receive ingress or egress network traffic. For instance, the firewall switchover event can be that firewall A 100 is due for software updates, that firewall A 100 is overloaded in a cloud 150 or other load-balancing complications, that firewall A 100 is deprecated, etc. To perform the firewall switchover event, ingress and egress network traffic from the Internet 160 should be correctly routed at a cloud provider gateway 104 according to its current network address translation (NAT) table 107A. Accordingly, an orchestrator 170 managing firewall A 100 and firewall B 102 in the cloud 150 queries the cloud provider gateway 104 to update an IP address binding 106A in the current NAT table 107A by which traffic is routed to firewall A 100 to instead route to firewall B 102. During the transitional period while the IP address binding is updated by a CSP, firewall A 100 and firewall B 102 enter the pseudo-active/active configuration during which firewall A 100 continues to receive egress and ingress network traffic until a transitional IP address binding 106B (i.e., the current binding during the transition from the IP binding update that could map to either of firewalls 100 and 102 depending on whether the update has occurred) and NAT table 107B are successfully updated.

Firewall A 100 and firewall B 102 are running on cloud instances 110 and 112, respectively, in a high availability configuration. Cloud instances 110 and 112 can be any cloud instances hosted natively or by a cloud provider. For instance, cloud instances 110 and 112 can be Amazon EC2® instances, Google Cloud Provider® virtual machines, etc. The high availability configuration comprises a CP link and a DP link. The CP HA link can exchange heartbeats, hello messages, state information, routing synchronization data, user ids, etc. The DP HA link can synchronize sessions, forwarding tables, Internet Protocol Security (IPsec) security associations, Address Resolution Protocol (ARP) tables, etc. The firewalls 100 and 102 are configured to handle both switchover and failover events, and in some embodiments can automatically detect these events and perform corrective action (e.g., entering pseudo-active/active states) accordingly.

Throughout the operations at stages A-D, the orchestrator 170 communicates instructions for traffic redirection during the pseudo-active/active configuration. These instructions can be communicated to a CSP via an application programming interface (API) that manages firewalls in the cloud 150. In other embodiments, the orchestrator 170 communicates with a natively hosted service managing the cloud 150 that manages firewall states and traffic routing. Firewalls in the cloud 150 can be configured to directly receive instructions from the orchestrator 170 and, alternatively, can have native instructions for initiating active, pseudo-active, and passive states. While the cloud provider gateway 104 is depicted as a routing service provided by a CSP managing firewalls in the cloud 150, it can be any wide area network (WAN) router or software-defined wide area network (SD-WAN) router configured to direct traffic between firewalls in the cloud 150 and the Internet 160.

Various operations in FIGS. 1 and 2 for interacting with a CSP and entering various active/passive, pseudo-active/active, and passive/active configurations for firewalls are performed by the orchestrator 170. Any of the various operations can be performed by code executed at the firewalls 100 and 102 and/or other components not depicted in FIGS. 1 and 2. In some embodiments, firewall A 100 communicates instructions to firewall B 102 to perform the sequence of depicted operations. Operations within the pseudo-active/active configuration can vary, and FIGS. 1 and 2 are two example embodiments of traffic handling with minimized traffic disruption during this configuration.

At stage A, during an initial active/passive configuration, firewall A 100 is initially in an active state wherein it receives ingress network traffic 103A and sends egress network traffic 101A. Ingress and egress traffic are processed through a cloud provider gateway 104 that acts as a middleman between the cloud 150 and the Internet 160. In some embodiments, the cloud provider gateway 104 processes ingress and egress network traffic across protocols for traffic in the cloud 150 and traffic to the Internet 160 and modifies packet headers accordingly. While depicted as a gateway for a cloud provider, the cloud provider gateway 104 can be any Internet gateway configured as an interface between traffic at the firewalls 100, 102 and traffic to and from the Internet 160.

Firewall B 102 is initially in a passive state wherein it does not receive or send network traffic. The cloud provider gateway 104 has a NAT table 107A including the firewall A IP address binding 106A that maps a public IP address 192.0.2.0 to private IP address 10.0.0.0 corresponding to firewall A 100. During flow of network traffic, upon receiving ingress network traffic 103A, the cloud provider gateway 104 updates the public IP address from packets having a destination IP address field 192.0.2.0 to have a destination IP address field 10.0.0.0 and maps the public destination port corresponding to firewall A 100 to the private port for firewall A 100. For egress network traffic 101A received from the firewall A 100, the cloud provider gateway 104 updates the source IP address for packets from the private IP address 10.0.0.0 to the public IP address 192.0.2.0 and also updates the private source port for firewall A 100 to the public source port corresponding to firewall A 100. The cloud provider gateway 104 can store private/public port pairs in the NAT table 107A in addition to private/public IP address pairs (e.g., when multiple firewalls are routed through the same public IP address according to their public/private ports) or, in other embodiments, can route traffic according to the public to private IP address entry.

At some point during network traffic flow for the active/passive configuration of firewall A 100 and firewall B 102, respectively, firewall A 100 is designated for a firewall switchover event. The firewall switchover event can be triggered by firewall A 100 or the orchestrator 170. For instance, firewall A 100 or the orchestrator 170 can detect a traffic load at firewall A 100 above a threshold, the orchestrator 170 can detect an out-of-date software version running on firewall A 100, an external entity can determine that firewall A 100 should be deactivated/suspended (e.g., a user monitoring the cloud 150), etc. The orchestrator 170 initiates the firewall switchover event and starts a pseudo-active timer. Subsequently, firewall A 100 switches from an active to a pseudo-active state, and firewall B 102 switches from a passive to an active state. The pseudo-active timer is a timer that exceeds an expected time interval for the firewall A IP address binding 106A to update and can include a buffer time interval to ensure that the pseudo-active timer doesn't expire prior to the firewall A IP address binding 106A successfully updating. For instance, if the average time for previously-seen IP address binding updates at the cloud provider gateway 104 is 30 seconds and the maximal previously-seen IP address binding update is 1 minute, then the pseudo-active timer can be chosen as 2 minutes with a buffer time interval of 1 minute. The pseudo-active timer can account for latency in communications between the orchestrator 170 and the cloud 150 during operations at stages B and C.

At stage B, the orchestrator 170 instructs firewall A 100 to enter a pseudo-active state and firewall B 102 to enter an active state. The orchestrator 170 queries firewall B 102 or, in some embodiments, a CSP managing the cloud 150 for firewall B 102 to enter an active state. In some embodiments, a passive state means that a firewall ceases receiving and sending all network traffic. In other embodiments, a passive state is specific to the public IP address, depicted as 192.0.2.0 in FIG. 1, and passive firewalls can be active for other IP addresses. Traffic is handled normally at firewall A 100 during its pseudo-active state. In some embodiments, one of firewalls 100 and 102 detect the switchover event and the firewalls 100, 102 automatically enter the pseudo-active/active configuration by communicating instructions via a CP link. In other embodiments, certain types of network traffic according to certain Internet protocols (e.g., Transmission Control Protocol (TCP) sessions, Transport Layer Security (TLS) sessions) are handled granularly in the data plane at firewall A 100, and the orchestrator 170 sends instructions to firewall A 100 to enter the pseudo-active state accordingly. This granular handling of network traffic is described in greater detail in an embodiment depicted in FIG. 2.

At stage C, the orchestrator 170 instructs the cloud provider gateway 104 to update the firewall A IP address binding 106A to a binding that indicates the private IP address of firewall B 102. Because this operation is not performed instantly at the cloud provider gateway 104, during the pseudo-active/active configuration, there is a transitional IP address binding 106B for a NAT table 107B. The transitional IP address binding 106B can route to either firewall A 100 or firewall B 102, and accordingly, the NAT table 107B comprises an entry from the public IP address 192.0.2.0 to either private IP address 10.0.0.0 corresponding to firewall A 100 or private IP address 10.0.0.1 corresponding to firewall B 102 depending on whether the transitional IP address binding 106B has updated. Ingress network traffic 103B is processed at the cloud provider gateway 104 and mapped to private IP address 10.0.0.0 or 10.0.0.1 according to the current transitional IP address binding 106B, as indicated by the dashed line between the transitional IP address binding 106B and the circle connecting traffic flow to and from both firewalls depicted in FIG. 1. Egress network traffic 101B from firewall A 100 and egress network traffic 101C from firewall B 102 have the source IP address mapped to 192.0.2.0 at the cloud provider gateway 104. The cloud provider gateway 104, when updating the transitional IP address binding 106B, can maintain the same public port number (i.e., the port number for network traffic that has been translated to the public IP address) for firewall A 100 prior to updating and firewall B 102 subsequent to updating. Thus, ingress network traffic 103B directed at this port with public IP address 192.0.2.0 will be correctly routed to firewall A 100 prior to updating the binding and firewall B 102 subsequent to updating the binding.

At stage D, on expiration of the pseudo-active timer, the orchestrator 170 instructs firewall A 100 to enter a passive state, initiating a passive/active configuration. Because the cloud provider gateway 104 maintained the same public port number for both firewall A 100 and firewall B 102 in the NAT table 107B, ingress network traffic will be routed to firewall B 102 and there is no dropped traffic routed to firewall A 100 during its passive state. In embodiments where the firewall switchover event is temporary (e.g., firewall A 100 is temporarily load balanced, software on firewall A 100 is upgraded, etc.), the operations in FIG. 1 can be performed with firewall A 100 and firewall B 102 switched, i.e., the firewalls enter an active/pseudo-active configuration and then an active/passive configuration.

FIG. 2 is a schematic diagram of an example system for directing flow of traffic corresponding to network sessions for a pseudo-active/active configuration of firewalls. Rerouting traffic corresponding to network sessions from firewall A 100 to firewall B 102 (running on cloud instances 110, 112 respectively) can result in dropping network sessions requiring session reconnection. To exemplify, TCP sessions have a state (e.g., ESTAB, FINWAIT-1, FINWAIT-2, CLOSING, TIMEWAIT, CLOSED, etc.) that transitions via control bits contained in TCP headers (e.g., ACK, FIN, SYN, etc.). With no prior knowledge of current states of TCP sessions at firewall A 100, after the transitional IP address binding 106B is updated and traffic from these TCP sessions routes to firewall B 102, firewall B 102 will have no notion of how to handle the TCP traffic and will let each TCP session timeout and enter a CLOSE state. Thus, the orchestrator 170 instructs firewall A 100 and firewall B 102 to sync session states for pre-update ingress network sessions 205, and for firewall A 100 to enter a forwarding state in its data plane (DP). In this forwarding state, firewall A 100 forwards network traffic to firewall B 102 in the data plane, and firewall B 102 records session data from the traffic before discarding. This allows firewall B 102 to appropriately handle traffic from sessions originally established with firewall A 100 after the transitional IP address binding 106B updates.

At stage A, a CP for firewall A 100 (operating in a pseudo-active state) forwards forwarding state instructions 211 to a DP for firewall A 100. The CP and DP as used herein are abstractions of routing components for traffic processing and routing at firewalls in the cloud 150. The CP refers to the component(s) that performs operations involving routing of traffic across firewalls, for instance updating routing tables, advertising routes, load balancing firewalls, and other operations that affect network topology of a network of firewalls in the cloud 150 including the firewall A 100 and the firewall B 102. The DP refers to the component(s) that performs operations involving packet handling, e.g., parsing of packet headers and processing of packets according to corresponding protocols, and the DP is managed via instructions from the CP. These abstractions are used for illustrative purposes and various components of the firewalls 100 102 can perform the described operations across both the CP and DP and, in some embodiments, operations can be performed by a WAN controller operating on the cloud 150.

The forwarding state instructions 211 comprise instructions to forward copies of packets for pre-update ingress network sessions 205 to the DP of firewall B 102, to communicate pre-update session state data 209 for existing sessions at firewall A 100 to firewall B 102, and to continue to process established sessions in the pre-update ingress network sessions 205 and egress network sessions 203A at firewall A 100. The forwarding state instructions 211 can additionally comprise instructions to forward unseen/not previously established ("new") sessions (e.g., based on an establishment message for a corresponding session protocol) in the pre-update ingress network sessions 205 to firewall B 102 so that firewall B 102 may establish and handle those new sessions while the transitional IP address binding 106B updates. In these embodiments, firewall A 100 discards traffic in the new sessions of the pre-update ingress network sessions 205 after communicating this traffic to firewall B 102. The DP at firewall A 100 then communicates pre-update session state data 209 to the DP at firewall B 102. The CP at firewall B 102 receives the pre-update session state data 209 from the DP and updates session state data for the firewall B 102 to include states for those sessions currently active at firewall A 100. In some embodiments, when traffic is forwarded from the DP of firewall A 100 to the DP of firewall B 102, the forwarding state instructions 211 include adding session state data into packet headers of the forwarded traffic. The session state data can be added into packet headers according to a corresponding session protocol, and firewall B 102 can be configured to receive packets for certain protocols that have the additional state information in the packet headers.

Prior to or simultaneous with the communication of forwarding state instructions 211, firewall A 100 begins a pseudo-active timer that corresponds to the length of time that firewall A 100 operates in a pseudo-active state. Firewall A 100 additionally communicates an indication of starting the pseudo-active timer to firewall B 102. Firewall A 100 and firewall B 102 can be configured to appropriately handle the pseudo-active/active configuration, for instance by having hard-coded values for the pseudo-active timer and various protocols according to types of network sessions to be handled, types of firewall switchover events, etc. In contrast to FIG. 1, the pseudo-active timers in FIG. 2 are synced, so that firewall A 100 and firewall B 102 both track the pseudo-active timer. Thus, firewall B 102 can migrate its public IP address in the cloud 150 prior to or simultaneous with expiration of the pseudo-active timer as depicted at stage F. In some embodiments, the orchestrator 107 tracks the pseudo-active timer and communicates with the firewall A 100, the firewall B 102, and the cloud provider gateway 104. In these embodiments, firewall A 100 may not communicate the pseudo-active timer to firewall B 102.

At stage B, the CP for firewall B 102 communicates packet handling instructions 215 to the DP at firewall B 102. The packet handling instructions 215 comprise instructions to, upon receipt of packets in the pre-update ingress network sessions 207 for established sessions at firewall A 100, record session information for the packets and then discard them. The packet handling instructions 215 can comprise instructions to record further data from the packets besides session information such as header fields, capture logs, etc. Additionally, for these established sessions at firewall A 100 the orchestrator 170 instructs the cloud provider gateway 104 to not advertise the route from the cloud provider gateway 104 to the firewall B 102 via firewall A 100 created by the forwarding state initialized at stage A. This is in accordance with split horizon route advertisement and avoids the count to infinity problem where the link in the DP between firewall A 100 and firewall B 102 goes down. In the count to infinity problem, for packets routed from the cloud provider gateway 104 to the firewall B 102 via firewall A 100, firewall B 102 determines that the direct route from firewall A 100 to firewall B 102 is down and detects the route from the cloud provider gateway 104 to firewall B 102 in its routing table, resulting in firewall B 102 sending the packet back to the cloud provide gateway 104. The packet would then alternate between the cloud provider gateway 104 and firewall B 102 endlessly. The packet handling instructions 215 can additionally comprise instructions to establish and handle traffic of new sessions in the pre-update ingress network sessions 207 not previously established by firewall A 100. In other embodiments, these new sessions are handled by firewall A 100 while the session states are forwarded to firewall B 100 in the pre-update network sessions 207 until the transitional IP address binding 106B is updated.

At stage C, the orchestrator 170 instructs the cloud provider gateway 104 to update the transitional IP address binding 106B to, for packets with destination IP address 192.0.2.0, route these packets to private IP address 10.0.0.1 for firewall B 102 instead of private address 10.0.0.0 for firewall A 100. Accordingly, the entry in NAT table 107B is updated with this private to public IP address entry. The processing time for the binding update depends on the CSP managing the cloud provider gateway 104 or, in other embodiments, the native system managing the cloud provider gateway 104 (for instance, the orchestrator 170), and can take 30 seconds. The pseudo-active timer is chosen to give a buffer between completion of updating the transitional IP address binding 106B and transitioning firewall A 100 from a pseudo-active to a passive mode. For instance, the pseudo-active timer can be chosen at 2 minutes to give a 1.5 minute buffer from the expected binding update durations.

At stage D, ingress network sessions 201 are mapped from public IP address 192.0.2.0 to private IP address 10.0.0.0 corresponding to firewall A 100. The ingress network sessions 201 are then routed by a router component of the cloud provider gateway 104 to firewall A 100 as pre-update ingress network sessions 205. During this phase after the pseudo-active timer starts and before the transitional IP address binding 106B is updated, firewall A 100 continues to process pre-update ingress network sessions 205 and egress network sessions 203A according to its active state protocols. Additionally, firewall A 100 copies packets received at the DP in the pre-update ingress network sessions 205 and forwards the copies as pre-update ingress network sessions 207 to firewall B 102. Firewall B 102, based on the packet handling instructions 215 communicated to its DP, records session information for established sessions at firewall A 100 in the pre-update ingress network sessions 207, tracks session states, and may record additional information such as capture logs before discarding these packets without processing or sending response messages. Additionally, in some embodiments, firewall B establishes and handles traffic for new sessions received at firewall A 100 in the pre-update ingress network sessions 207. In other embodiments, these new sessions in the pre-update ingress network sessions 205 are established and handled by firewall A 100 and firewall B 102 records session information for the new sessions upon receiving them in the pre-update ingress network sessions 207 and discards the corresponding traffic.

At stage E, after the transitional IP address binding 106B is updated, the cloud provider gateway 104 maps ingress network sessions 201 with destination IP address 192.0.2.0 to private IP address 10.0.0.1 corresponding to firewall B 102. Accordingly, the ingress network sessions 201 are routed to firewall B 102 as post-update ingress network sessions 213. Firewall B 102, in an active state, processes post-update ingress network sessions 213 and egress network sessions 203B according to its active configuration.

At stage F, firewall B 102 or, in some embodiments, the orchestrator 107 instructs the cloud provider gateway 104 to update a forwarding rule to include firewall B 102 and remove firewall A from available ports for load-balancing in the cloud 150. For instance, the orchestrator 107 can instruct the cloud provider gateway 104 through its API to add a port that maps to private IP address 10.0.0.1 in the NAT table 107B to its list of available ports for load balancing and to remove a port that maps to private IP address 10.0.0.0 in the NAT table from the list. Forwarding rules can be formatted according to a configuration of a cloud provider and/or native host of the cloud 150. This operation occurs at a time so that expiration of the pseudo-active timer and updating of the public IP address for firewall B 102 are synced as closely as possible. For instance, this can occur at a time of (pseudo-active timer—expected public IP address update time) subsequent to starting the pseudo-active timer. The operation at stage F is not depicted in FIG. 1 for brevity and can additionally be performed after the operations at stage C in FIG. 1 and prior to the operations at stage D in FIG. 1.

Figure 3:
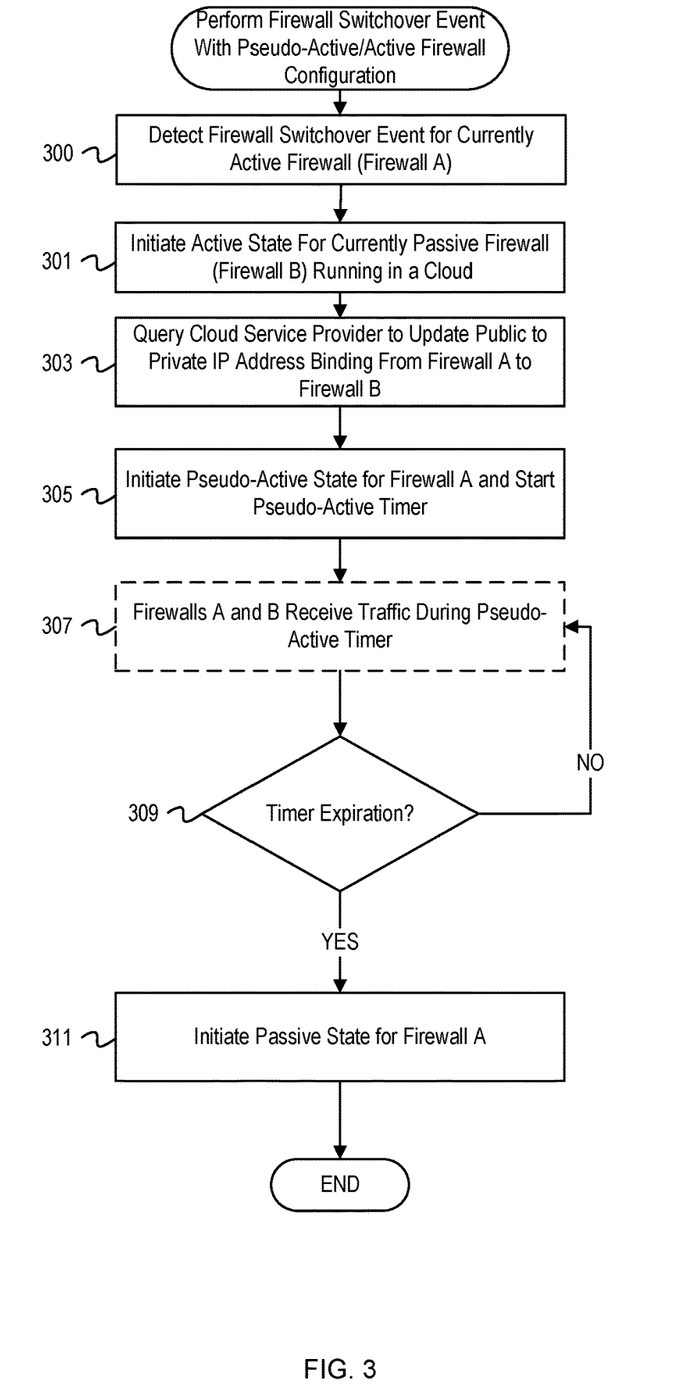
FIG. 3 is a flowchart of example operations for performing a firewall switchover event with a pseudo-active/active firewall configuration.
Figure 4:
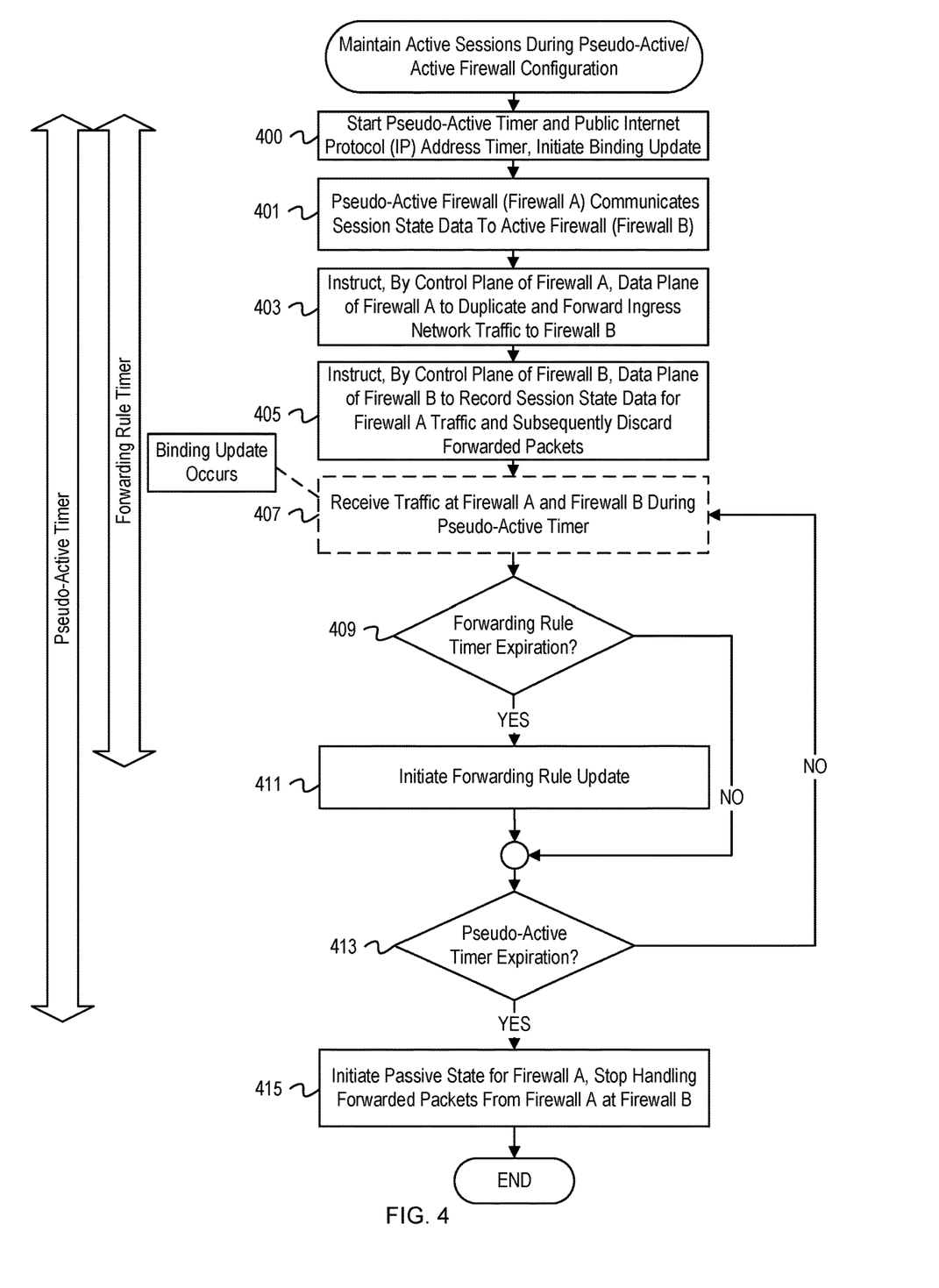
FIG. 4 is a flowchart of example operations for maintaining active sessions during a pseudo-active/active firewall configuration.
Figure 5:
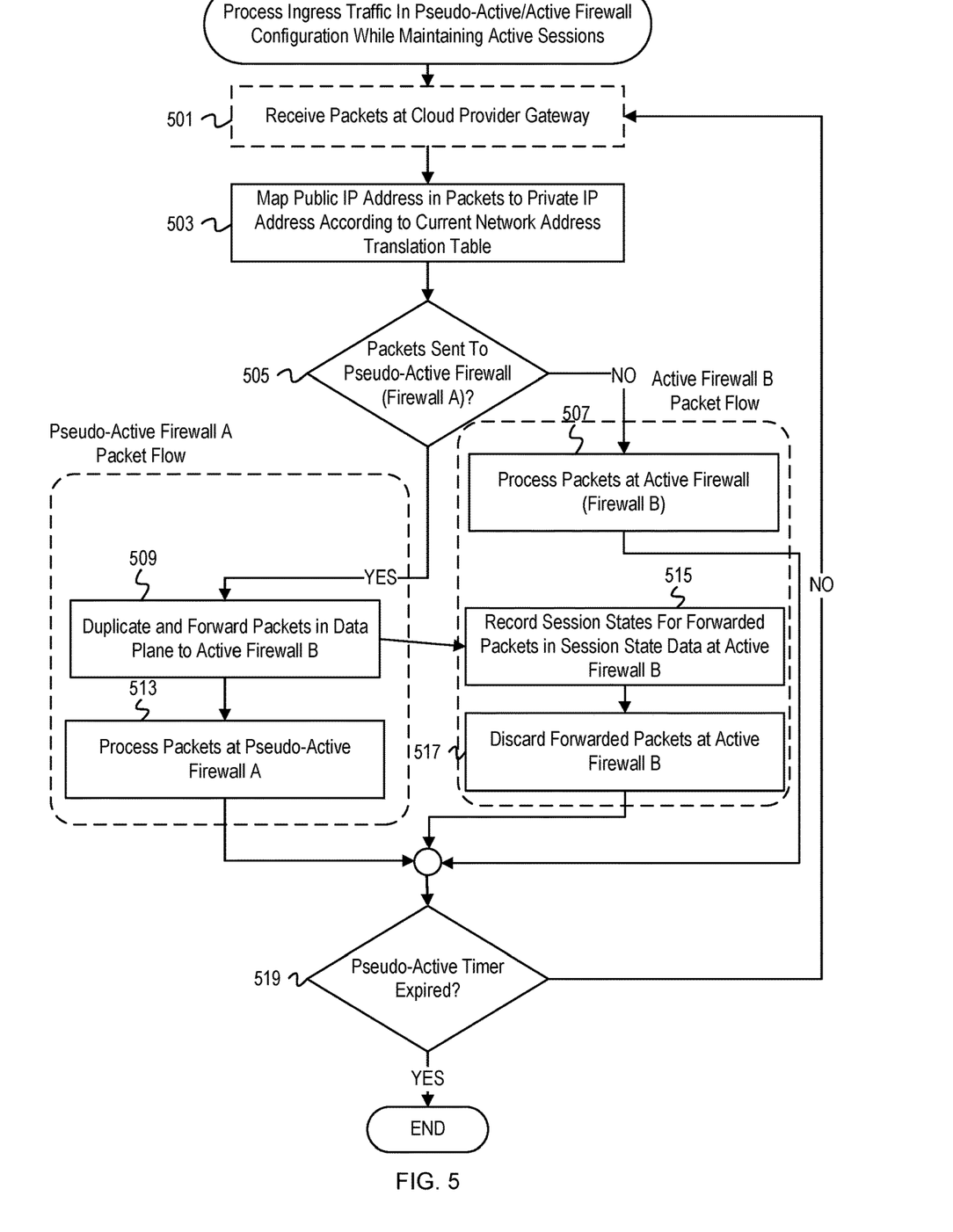
FIG. 5 is a flowchart of example operations for processing ingress traffic in a pseudo-active/active firewall configuration while maintaining active sessions.

The example operations in FIGS. 3-5 are described with reference to firewalls, a cloud provider gateway, and an orchestrator for consistency with the earlier figures. As mentioned in the foregoing, operations can be alternatively performed by various components. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for performing a firewall switchover event with a pseudo-active/active firewall configuration. At block 300, an orchestrator detects a firewall switchover event for a currently active firewall A. For instance, the orchestrator can determine that a software and/or hardware upgrade is required for firewall A, that firewall A is deprecated, that a load for firewall A exceeds a threshold and that traffic at firewall A to and from a public IP address will lessen the traffic load at firewall A to below the threshold, that firewall A needs a (metaphorical) vacation, etc.

At block 301, an orchestrator initiates an active state for a currently passive firewall (firewall B) running in a cloud. The orchestrator can query a CSP API to initiate an active state for firewall B or, in embodiments where the orchestrator is managing a natively hosted cloud, the orchestrator can directly initiate the active state for firewall B (e.g., via a native API for the cloud). In some embodiments, the orchestrator can determine that a new firewall should be initialized, and firewall B is initialized and then subsequently initiated into an active state. The determination that a new firewall should be initialized can be based on a number of currently active/passive firewalls, network topology for the cloud, load balancing, etc. In its active state, firewall B is configured to handle ingress and egress network traffic. For instance, firewall B is configured to capture logs for packets in ingress and egress network traffic and generate features from the capture logs such as malware verdicts. Malicious malware verdicts can trigger security events such as blocking and/or remediating devices, IP addresses, etc. at the cloud.

At block 303, the orchestrator queries a CSP that offers the cloud to update a public to private IP address binding from firewall A to firewall B. The binding update occurs at a cloud provider gateway or other routing component that routes traffic from firewalls in the cloud to the Internet, and a NAT table is updated at the cloud provider gateway. A NAT table at the cloud provider gateway is updated to replace an entry that maps a public IP address for firewall A to a private IP address for firewall A to an entry that maps the public IP address to a private IP address for firewall B. In some embodiments, the orchestrator and/or the firewalls themselves update the binding via a router (e.g., a WAN controller) managing traffic to the firewalls in the cloud. The update operation can take time interval (e.g., 30 seconds) during which immediately shutting down firewall A would result in traffic disruption.

At block 305, the orchestrator initiates a pseudo-active state for firewall A and starts a pseudo-active timer. The pseudo-active timer is tuned so that the timer is longer than a period of time during which the binding updates. For instance, when the binding update takes 30 seconds, then the pseudo-active timer can be 2 minutes to give a buffer of 1.5 minutes. Once the pseudo-active timer starts, firewall A enters a pseudo-active state. In the pseudo-active state, firewall A continues to process ingress and egress traffic as in its active state to prevent traffic disruption during the firewall switchover event.

At block 307, firewalls A and B receive traffic during activity of the pseudo-active timer. Traffic gets routed according to the current binding at the cloud provider gateway or other router, which is to the private IP address for firewall A prior to the binding update and to the private IP address for firewall B after the binding update. With firewall A in the pseudo-active state and firewall B in the active state, both are able to handle traffic according to normal handling protocols at the firewalls. Block 307 is depicted with a dotted outline in FIG. 3 to express that firewalls A and B both can process traffic during the pseudo-active timer.

At block 309, the orchestrator determines whether the pseudo-active timer has expired. In some embodiments, the firewall A can track the pseudo-active timer and can determine whether the timer has expired. Firewall B may not track the pseudo-active timer because the operations subsequent to timer expiration involve firewall A, and firewall B continues in its active state. If the pseudo-active timer is expired, operations continue to block 311. Otherwise, operations continue to block 307 for additional traffic handling at firewalls A and B.

At block 311, the orchestrator initiates a passive state for firewall A. Alternatively, firewall A can be configured to enter a passive state on its own. The passive state comprises a state where firewall A cannot send or receive network traffic. Depending on the firewall switchover event, the passive state for firewall A can be a suspended state that maintains the firewall instance for later active operations (e.g., for a software update at firewall A) or, in other instances, the firewall instance for firewall A can be deactivated/deleted (e.g., when firewall A is deprecated). For instance, for deactivating/deleting the firewall A, one or more servers hosting the firewall A can be powered down, a CSP can be queried to delete the firewall instance, memory for the firewall A can be reallocated in a native cloud environment, etc.

FIG. 4 is a flowchart of example operations for maintaining active sessions while firewalls are in a pseudo-active/active firewall configuration. Sessions are stateful; thus, performing the binding update in FIG. 3 without accounting for how to handle traffic at a pseudo-active firewall (firewall A) and an active firewall (firewall B) would result in session disconnection of active sessions with firewall A when the binding is updated. The example operations of FIG. 4 address this issue by intelligently handling traffic to sync states of active sessions at firewall A with firewall B so that, post-binding update, firewall B can handle these network sessions. FIG. 4 describes various operations between firewalls A and B. These firewalls can be configured to natively execute these operations when a pseudo-active timer is started or, in other embodiments, an orchestrator can track timers and instruct firewalls A and B accordingly.

At block 400, an orchestrator starts a pseudo-active timer and a forwarding rule timer and initiates a binding update. The pseudo-active timer indicates how long firewalls in a cloud will maintain a pseudo-active/active configuration during a firewall switchover event and is tuned to exceed an expected period of time to update a binding and to update a public IP address with additional buffer to account for possible lag in both of these events. The forwarding rule timer is tuned so that beginning a public IP address update at the expiration of the forwarding rule timer will result in the public IP address updating at approximately the expiration of the pseudo-active timer. For instance, the forwarding rule timer can be chosen as (pseudo-active timer—expected time to update public IP address). The expected time to update the public IP address may be a value selected based on expert/domain knowledge or experimentation. The binding update is an update for public to private IP address translation between firewalls A and B and an Internet gateway by which ingress and egress traffic is sent between the firewalls and the Internet. The binding update comprises an update to the entry that maps a private IP address for firewall A to a public IP address of the Internet gateway in front of one or more firewalls, where the updated binding maps a private IP address for firewall B to the public IP address. In some embodiments, this binding update is performed at a cloud provider gateway for a CSP hosting the firewalls in a cloud. As depicted in FIG. 4, the pseudo-active timer expires at block 415, the forwarding rule timer expires at block 411, and the binding update occurs sometime during operations at block 407. Due to the tuning of the pseudo-active and forwarding rule timers, this binding update occurs prior to blocks 411 and 415.

At block 401, a pseudo-active firewall (firewall A) communicates session state data to an active firewall (firewall B). Firewall A was previously active and firewall B was previously passive prior to starting the pseudo-active session timer. Thus, firewall A maintains records of active sessions in ingress and egress network traffic. The session state data comprise session state data for active sessions at firewall A that are stateful, e.g., TCP and TLS sessions.

At block 403, the CP for firewall A instructs the DP for firewall A to duplicate and forward ingress network traffic to firewall B. The DP for firewall A forwards packets to firewall B for the purpose of tracking sessions states so that firewall B can properly handle active sessions once firewall A is passive. In some embodiments, the DP for firewall A forwards packet headers and/or state information along with session identifiers (e.g., source IP address/port, destination IP address/port, etc.). Due to low latency of traffic in the data plane, the forwarding state for firewall A can be efficient, e.g., when firewalls A and B are on-premises so that a data plane link is fast. Accordingly, firewalls A and B can be configured with a DP link that ensures a high-fidelity, high-speed communication of forwarded packets, and moreover, this link can be specific to maintaining state information at each firewall (e.g., via a dedicated port).

At block 405, the CP of firewall B instructs the DP of firewall B to record session state data for firewall A traffic and to subsequently discard forwarded packets. For instance, for TCP traffic the DP of firewall B can parse the transport layer packet header in packets to determine current sate information based on a previously stored state for each active session at firewall A. For instance, the DP of firewall B can read control bits in TCP headers (e.g., SYN, ACK, etc.) that dictate transitions through the state diagram for TCP that is internally coded at firewall B. Firewall B does not send responses for any forwarded packets to avoid split-horizon route advertisement by a router handling ingress/egress traffic for firewalls A and B.

At block 407, firewalls A and B receive traffic for the duration of the pseudo-active timer. Firewalls A and B continue to process traffic according to their active state. Block 407 is depicted with a dashed outline to indicate that operations for receiving traffic occur until expiration of the pseudo-active timer. Traffic is routed to firewalls A and B according to the current public to private IP address binding. Initially, ingress traffic is routed to firewall A, and as indicated by the box "binding update occurs" in FIG. 4, a binding update occurs during activity of the pseudo-active timer and forwarding rule timer. The pseudo-active timer and forwarding rule timer are tuned so that the binding update occurs prior to either of blocks 409 or 413 being satisfied.

At block 409, firewalls A and B determine whether the forwarding rule timer has expired. This determination can be according to an internal clock at each firewall. In some embodiments, the forwarding rule timer is only tracked at firewall B. If the forwarding rule timer has expired, operations continue to block 411. Otherwise, operations continue to block 413.

At block 411, at least one of firewalls A and B initiates a forwarding rule update for firewall B. For instance, firewall B can communicate to a CSP to update a forwarding rule that enumerates available firewalls (e.g., indexed by port number) over a network to replace firewall A with firewall B. The operations of updating the public IP address are not instantaneous, and the forwarding rule timer is tuned so that the update occurs in proximity to or simultaneous to expiration of the pseudo-active timer. After the update occurs, a router or Internet gateway managing the network will have firewall B on its list of available firewalls and firewall A will be removed from the list.

At block 413, firewalls A and B determine whether the pseudo-active timer has expired. If the pseudo-active timer has expired, operations continue to block 415. Otherwise, operations continue to block 407.

At block 415, firewall A initiates a passive state, and firewall B stops handling forwarded packets from firewall A. For instance, the CP at firewall B can instruct the DP at firewall B to process forwarded packets from firewall A according to its normal procedure for handling forwarded packets (e.g., not discarding packets after session states are tracked). Firewall A can be powered down, disconnected from the cloud, deactivated by a CSP, etc.

FIG. 4 describes operations for maintaining active (i.e., previously established) sessions during a pseudo-active/active firewall configuration of firewalls A and B. In some embodiments, unseen ("new") sessions that aren't previously established by firewall A are handled by firewall B during this pseudo-active/active firewall configuration. In these embodiments, CP instructions to the DP of firewall A include instructions to forward new sessions without processing these sessions according to an active configuration for firewall A and without sending response packets according to a corresponding session protocol. Additionally, CP instructions to the DP of firewall B include instructions to establish and handle traffic in the new sessions according to the corresponding session protocol.

FIG. 5 is a flowchart of example operations for processing ingress traffic in a pseudo-active/active firewall configuration while maintaining active sessions. At block 501, packets are received at a cloud provider gateway. Block 501 is depicted with a dashed outline to indicate that receipt of packets while firewalls are in the pseudo-active/active firewall configuration can be ongoing as the remainder of operations depicted in FIG. 5 are performed. Although described as being received at a cloud provider gateway, packets can be received and routed by any routing component managing routes in a cloud (e.g., a WAN controller).

At block 503, the cloud provider gateway maps public IP address in packets to private IP addresses according to a current NAT table. The private IP addresses correspond to firewalls in the cloud, and the NAT table can change during the pseudo-active/active firewall configuration based on a binding update previously initiated at the cloud provider gateway.

At block 505, if the packets were sent to the pseudo-active firewall A (i.e., the NAT table mapped the public IP address to a private IP address for firewall A), operations proceed to blocks 515 and 509. Otherwise, operations proceed to block 507. As depicted by the dashed outlines in FIG. 5, the operations at blocks 507, 515, and 517 are performed at an active firewall (firewall B), while the operations at blocks 509 and 513 are performed at a pseudo-active (firewall A). The operations at firewall A and firewall B can occur simultaneously and in parallel as packets are processed and sent to firewalls A and B by the cloud provider gateway.

At block 507, firewall B processes packets. Firewall B processes packets according to its active state including any corresponding parsing, logging, throttling, classification, intercepting, etc. operations.

At block 509, firewall A duplicates and forwards packets in the DP to the active firewall B. Firewall A can communicate packets in the DP to firewall B along a high availability, on premises link. This data link can be specifically allocated to state syncing across firewalls and can be allocated to a specific port at each firewall. In some embodiments, forwarding from firewall A to firewall B occurs in a CP link.

At block 513, the pseudo-active firewall A processes the packets. This operation occurs according to an active state for firewall A and can differ from the active state at firewall B, for instance when firewalls A and B are running different software versions (e.g., the firewall switchover event resulting in the pseudo-active/active firewall configuration was a software upgrade for firewall A). In some embodiments, for unseen ("new") sessions not previously established at firewall A, firewall A forwards packets in these new sessions to firewall B without processing these packets (e.g., without establishing/handling sessions according to a session protocol).

At block 515, after firewall B receives packets forwarded from firewall A at block 509, the DP at firewall B records sessions for forwarded packets in session state data at firewall B. Firewall B can, for instance, determine state transitions for sessions corresponding to forwarded packets (e.g., with the same source IP address/port, destination IP address/port, and protocol) based on control bits in packet headers. Firewall B can store session states as tuples in a table comprising session identifiers and current session state.

At block 517, the active firewall B discards forwarded packets. Firewall B discards the packets and does not send response messages to the cloud provider gateway to avoid split horizon route advertisement. For forwarded packets in new sessions (e.g., as indicated by an establishment field in a packet header according to a session protocol), firewall B can process these packets according to its active configuration including establishing and handling the new sessions and, in these embodiments, these new sessions are not established/handled by firewall A.

At block 519, if the pseudo-active timer has expired, operations in FIG. 5 are complete. Otherwise, operations continue to 501 for receiving any additional packets at the cloud provider gateway.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 507, 509, 513, 515, and 517 can be performed in parallel or concurrently. Any operations for receiving and processing traffic at firewalls can occur concurrently across sessions/flows. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
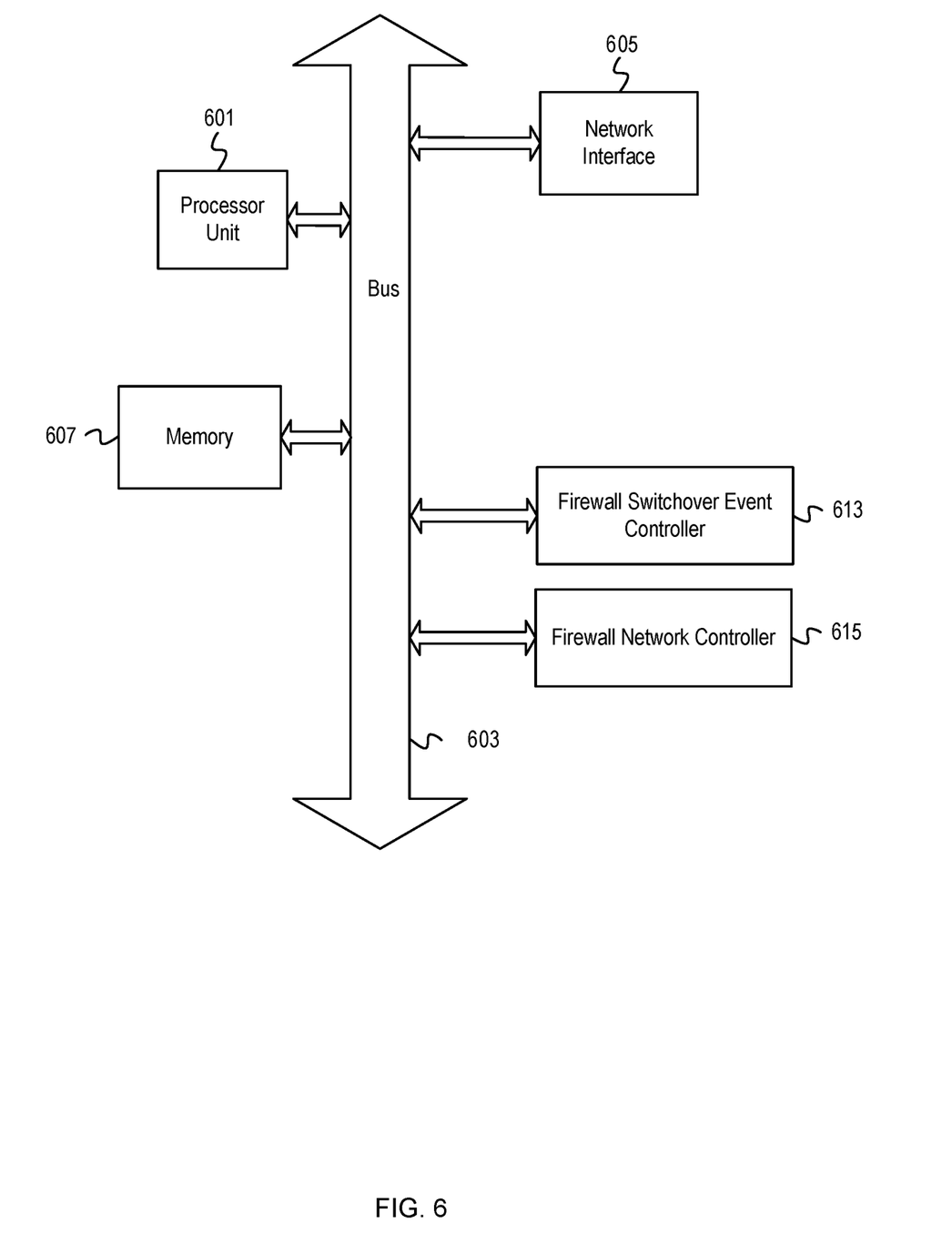
FIG. 6 depicts an example computer system with a firewall switchover event controller and a firewall network controller in a high availability configuration that supports pseudo-active firewall states.

FIG. 6 depicts an example computer system with a firewall switchover event controller, and a firewall network controller in a high availability configuration that supports pseudo-active firewall states. The computer system includes a processor 601 (possibly including multiple processors, multiple cores, multiple nodes, and/or implementing multithreading, etc.). The computer system includes memory 607. The memory 607 may be system memory or any one or more of the above already described possible realizations of machine-readable media. The computer system also includes a bus 603 and a network interface 605. The computer system also includes a firewall switchover event controller 613 and a firewall network controller 615. The firewall network controller 615 routes network traffic in a network including ingress and egress traffic at firewalls managed by the firewall switchover event controller 613. The firewall switchover event controller 613 performs a firewall switchover event wherein an active firewall enters a pseudo-active state, a passive firewall enters an active state, and after a pseudo-active timer expires and a binding is updated to direct traffic to the now active firewall, the pseudo-active firewall enters a passive state. This procedure can be modified by the firewall switchover event controller 613 to handle active network sessions at the pseudo-active firewall as described variously above. Moreover, although depicted as components of an example computer system, any of the components 613 and 615 can be components for distinct and, in some embodiments, multiple computer systems. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for performing a firewall switchover event using a pseudo-active/active configuration of firewalls in a cloud as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising,
based on switchover from a first firewall to a second firewall in a first network, instructing an Internet gateway communicatively coupled to the first firewall and the second firewall over the first network to update an Internet Protocol (IP) address binding for a public IP address associated with the first and second firewalls to indicate a first private IP address of the second firewall;
initiating a first transition from an active state to a pseudo-active state for the first firewall, wherein, in the pseudo-active state, based on ingress of a first packet corresponding to a first session, the first firewall forwards the first packet along a data plane link to the second firewall;

initiating a second transition from a passive state to an active state for the second firewall, wherein, in the active state, the second firewall discards the first packet based, at least in part, on a determination of a first state of the first session indicated in the first packet; and based on determining that an expected duration for updating the IP address binding has expired, initiating a third transition from the pseudo-active state to a passive state for the first firewall.

2. The method of claim 1, further comprising, subsequent to updating the IP address binding for the public IP address associated with the first and second firewalls to indicate the first private IP address, receiving a second packet communicated from the Internet gateway at the second firewall corresponding to the first session in the first state;

handling the second packet at the second firewall according to the first state of the first session; and determining a second state for the first session based, at least in part, on handling the second packet at the second firewall.

3. The method of claim 1, further comprising, initiating a forwarding rule duration for the first firewall, wherein the forwarding rule duration is tuned to expire after initiating the first transition from the active state to the pseudo-active state for the first firewall and prior to initiating the third transition from the pseudo-active state to the passive state for the first firewall; and based on determining that the forwarding rule duration has expired, updating a forwarding rule for the first network to replace a first port for the first firewall with a second port for the second firewall.

4. The method of claim 1, further comprising handling the first packet at the first firewall according to an active state for the first firewall.

5. The method of claim 1, wherein updating the IP address binding comprises replacing a first entry in a network address translation (NAT) table mapping the public IP address to a second private IP address of the first firewall with a second entry mapping the public IP address to the first private IP address of the second firewall.

6. The method of claim 1, wherein the first firewall and second firewall are in a high availability configuration, wherein the high availability configuration includes the data plane link and a control plane link between the first firewall and second firewall.

7. The method of claim 1, further comprising inserting indications of the first state for the first session to fields in a packet header for the first packet at the first firewall prior to forwarding the first packet.

8. The method of claim 1, wherein determining the first state for the first session comprises, determining a third state for the first session prior to the first state; and transitioning in a state diagram from the third state to the first state based, at least in part, on one or more fields in the first packet and a first protocol for the first session, wherein the state diagram is a state diagram for the first protocol.

9. A non-transitory computer-readable medium having instructions stored thereon that are executable by a computing device, the instructions to, based on switchover from a first firewall to a second firewall in a first network, instruct an Internet gateway communicatively coupled to the first firewall and the second firewall over the first network to update an Internet Protocol (IP) address binding for a public IP address associated with the first and second firewalls to indicate a first private IP address of the second firewall;

initiate a first transition from an active state to a pseudo-active state for the first firewall, wherein, in the pseudo-active state, based on ingress of a first packet corresponding to a first session, the first firewall forwards the first packet along a data plane link to the second firewall;

initiate a second transition from a passive state to an active state for the second firewall, wherein, in the active state, the second firewall discards the first packet based, at least in part, on a determination of a first state for the first session at the second firewall from captured log files of a packet header for the first packet; and based on determining that an expected duration for updating the IP address binding has expired, initiate a third transition from the pseudo-active state to a passive state for the first firewall.

10. The computer-readable medium of claim 9, further comprising instructions to, initiate a forwarding rule duration for the first firewall, wherein the forwarding rule duration is tuned to expire after initiating the first transition from the active state to the pseudo-active state for the first firewall and prior to initiating the third transition from the pseudo-active state to the passive state for the first firewall; and based on determining that the forwarding rule duration has expired, update a forwarding rule for the first network to replace a first port for the first firewall with a second port for the second firewall.

11. The computer-readable medium of claim 9, further comprising instructions to handle the first packet at the first firewall according to an active state for the first firewall.

12. The computer-readable medium of claim 9, wherein the instructions to update the IP address binding comprise instructions to replace a first entry in a network address translation (NAT) table mapping the public IP address to a second private IP address of the first firewall with a second entry mapping the public IP address to the first private IP address of the second firewall.

13. The computer-readable medium of claim 9, wherein the first firewall and second firewall are in a high availability configuration, wherein the high availability configuration includes the data plane link and a control plane link between the first firewall and second firewall.

14. The computer-readable medium of claim 9, wherein the instructions to determine the first state of the first session at the second firewall comprise instructions to determine that one or more fields in log files captured from the packet header indicate the first state of the first session.

15. The computer-readable medium of claim 9, further comprising instructions to:

subsequent to updating the IP address binding for the public IP address associated with the first and second firewalls to indicate the first private IP address, receive a second packet communicated from the Internet gateway at the second firewall corresponding to the first session in the first state;

handle the second packet at the second firewall according to the first state of the first session; and determine a second state for the first session based, at least in part, on the instructions to handle the second packet at the second firewall.

16. An apparatus comprising,
a processor; and
a computer-readable medium having instructions stored thereon that are executable by the processor to cause the apparatus to,
based on switchover from a first firewall to a second firewall in a first network, instruct an Internet gateway communicatively coupled to the first firewall and the second firewall over the first network to update an Internet Protocol (IP) address binding for a public IP address associated with the first and second firewalls to indicate a first private IP address of the second firewall;
initiate a first transition from an active state to a pseudo-active state for the first firewall, wherein, in the pseudo-active state, based on ingress of a first packet corresponding to a first session, the first firewall forwards the first packet along a data plane link to the second firewall;
initiate a second transition from a passive state to an active state for the second firewall, wherein, in the active state, the second firewall discards the first packet based, at least in part, on a determination of a first state of the first session indicated in the first packet; and
based on determining that an expected duration for updating the IP address binding has expired, initiate a third transition from the pseudo-active state to a passive state for the first firewall.

17. The apparatus of claim 16, wherein the computer-readable medium further has stored thereon instructions executable by the processor to cause the apparatus to:
subsequent to updating the IP address binding for the public IP address associated with the first and second firewalls to indicate the first private IP address, receive a second packet communicated from the Internet gateway at the second firewall corresponding to the first session in the first state;
handle the second packet at the second firewall according to the first state of the first session; and
determine a second state for the first session based, at least in part, on the instructions executable by the processor to cause the apparatus to handle the second packet at the second firewall.

18. The apparatus of claim 16, wherein the computer-readable medium further has stored thereon instructions executable by the processor to cause the apparatus to:
initiate a forwarding rule duration for the first firewall, wherein the forwarding rule duration is tuned to expire after initiating the first transition from the active state to the pseudo-active state for the first firewall and prior to initiating the third transition from the pseudo-active state to the passive state for the first firewall; and
based on determining that the forwarding rule duration has expired, update a forwarding rule for the first network to replace a first port for the first firewall with a second port for the second firewall.

19. The apparatus of claim 16, wherein the instructions to update the IP address binding comprise instructions executable by the processor to cause the apparatus to replace a first entry in a network address translation (NAT) table mapping the public IP address to a second private IP address of the first firewall with a second entry mapping the public IP address to the first private IP address of the second firewall.

20. The apparatus of claim 16, wherein the first firewall and second firewall are in a high availability configuration, wherein the high availability configuration includes the data plane link and a control plane link between the first firewall and second firewall.

* * * * *